(12) United States Patent
Kray et al.

(10) Patent No.: US 12,037,921 B2
(45) Date of Patent: Jul. 16, 2024

(54) FAN FOR A TURBINE ENGINE

(71) Applicant: General Electric Company, Schenectady, NY (US)

(72) Inventors: Nicholas J. Kray, Mason, OH (US); David W. Crall, Loveland, OH (US); Anthony L. DiPietro, Maineville, OH (US)

(73) Assignee: GENERAL ELECTRIC COMPANY, Cincinnati, OH (US)

( * ) Notice: Subject to any disclaimer, the term of this patent is extended or adjusted under 35 U.S.C. 154(b) by 0 days.

(21) Appl. No.: 17/817,511

(22) Filed: Aug. 4, 2022

(65) Prior Publication Data

US 2024/0044253 A1 Feb. 8, 2024

(51) Int. Cl.
*F01D 5/14* (2006.01)
*F01D 25/32* (2006.01)
*F02K 3/06* (2006.01)

(52) U.S. Cl.
CPC ............... *F01D 5/146* (2013.01); *F02K 3/06* (2013.01); *F01D 25/32* (2013.01); *F05D 2220/32* (2013.01); *F05D 2220/36* (2013.01); *F05D 2240/30* (2013.01)

(58) Field of Classification Search
CPC .......... F01D 5/141; F01D 5/146; F01D 25/32; F02K 3/06; F02C 7/05; F04D 29/324; F04D 29/544; F04D 29/681; F04D 29/323; F04D 29/325; F04D 29/384; F04D 19/00; F04D 21/00; F05D 2220/36
See application file for complete search history.

(56) References Cited

U.S. PATENT DOCUMENTS

| | | | |
|---|---|---|---|
| 4,512,718 A * | 4/1985 | Stargardter | F04D 29/324 415/181 |
| 5,236,307 A | 8/1993 | Ng et al. | |
| 5,680,754 A | 10/1997 | Giffin et al. | |
| 5,988,980 A | 11/1999 | Busbey et al. | |
| 6,722,847 B2 * | 4/2004 | Freeman | F04D 29/321 415/119 |
| 7,094,027 B2 | 8/2006 | Turner et al. | |
| 7,753,652 B2 | 7/2010 | Truckenmueller | |
| 8,303,258 B2 | 11/2012 | Aubin | |
| 9,874,221 B2 | 1/2018 | DiPietro, Jr. et al. | |
| 9,896,937 B2 | 2/2018 | Dextraze | |

(Continued)

FOREIGN PATENT DOCUMENTS

| | | |
|---|---|---|
| BR | 102015020296 A2 | 7/2016 |
| BR | 102015031429 A2 | 10/2016 |

(Continued)

*Primary Examiner* — Topaz L. Elliott
(74) *Attorney, Agent, or Firm* — Venable LLP; Michele V. Frank (57) ABSTRACT

A fan for a turbine engine having a core air flowpath and a bypass air flowpath. The fan includes a disk, a plurality of fan blades, and a plurality of splitter blades. The disk rotates about a centerline axis. The plurality of fan blades are coupled to the disk. The plurality of splitter blades are coupled to the disk and positioned between the plurality of fan blades. The plurality of splitter blades are axially aligned on the disk at a splitter blade axial distance from an annular inlet of the core air flowpath such that the plurality of splitter blades direct debris that passes through the fan into the bypass air flowpath.

16 Claims, 8 Drawing Sheets

(56) References Cited

U.S. PATENT DOCUMENTS

| | | | |
|---|---|---|---|
| 9,938,984 B2 | 4/2018 | DiPietro, Jr. et al. | |
| 11,149,552 B2 | 10/2021 | DiPietro, Jr. et al. | |
| 2004/0020186 A1* | 2/2004 | Orlando | F02C 3/067 |
| | | | 60/39.162 |
| 2006/0059887 A1* | 3/2006 | Klingels | F02K 3/072 |
| | | | 60/226.1 |
| 2008/0095614 A1* | 4/2008 | Aubin | F01D 5/146 |
| | | | 416/193 A |
| 2013/0011266 A1* | 1/2013 | Gallagher | F02K 3/06 |
| | | | 416/223 A |
| 2014/0255197 A1* | 9/2014 | Yu | F04D 29/324 |
| | | | 29/889.6 |
| 2014/0314549 A1 | 10/2014 | Pakkala et al. | |
| 2016/0024931 A1* | 1/2016 | Hiernaux | F01D 9/041 |
| | | | 416/227 R |
| 2017/0009781 A1* | 1/2017 | Maniere | F04D 29/542 |
| 2017/0114796 A1 | 4/2017 | DiPietro, Jr. et al. | |
| 2018/0017019 A1 | 1/2018 | DiPietro, Jr. et al. | |
| 2018/0017079 A1 | 1/2018 | DiPietro, Jr. et al. | |
| 2018/0187600 A1* | 7/2018 | Moniz | F02K 3/06 |
| 2018/0335051 A1* | 11/2018 | Lurie | F04D 29/542 |
| 2019/0154055 A1* | 5/2019 | Wadia | F04D 29/324 |
| 2020/0049014 A1* | 2/2020 | Clements | F01D 5/145 |
| 2020/0325852 A1* | 10/2020 | Sidelkovskiy | F02K 3/06 |
| 2020/0362713 A1* | 11/2020 | Bertini | F01D 5/146 |
| 2021/0156317 A1 | 5/2021 | Phelps et al. | |
| 2021/0222575 A1* | 7/2021 | Breeze-Stringfellow | F01D 25/12 |
| 2021/0239132 A1 | 8/2021 | DiPietro, Jr. et al. | |
| 2022/0243596 A1* | 8/2022 | Ray | F01D 5/143 |

FOREIGN PATENT DOCUMENTS

| | | | | |
|---|---|---|---|---|
| BR | 102016024900 A2 | | 7/2017 | |
| CA | 2901715 A1 | | 6/2016 | |
| CA | 2915469 A1 | | 6/2016 | |
| CA | 2945103 A1 | | 4/2017 | |
| CN | 105736460 A | | 7/2016 | |
| CN | 105736461 A | | 7/2016 | |
| CN | 107035435 A | | 8/2017 | |
| CN | 109416050 A | | 3/2019 | |
| CN | 109477391 A | | 3/2019 | |
| CN | 112983885 A | | 6/2021 | |
| CN | 114165477 A | * | 3/2022 | |
| EP | 0900920 A2 | | 3/1999 | |
| EP | 2072757 A1 | | 6/2009 | |
| EP | 3040511 A1 | | 7/2016 | |
| EP | 3040512 A1 | | 7/2016 | |
| EP | 3163028 A1 | | 5/2017 | |
| EP | 3485146 A1 | | 5/2019 | |
| EP | 3485171 A2 | | 5/2019 | |
| FR | 3118792 A1 | * | 7/2022 | F01D 5/146 |
| GB | 630747 A | | 10/1949 | |
| GB | 1514096 A | | 6/1978 | |
| JP | 4368435 B2 | | 11/2009 | |
| WO | 2018013422 A2 | | 1/2018 | |
| WO | 2018084902 A1 | | 5/2018 | |

\* cited by examiner

FAN FOR A TURBINE ENGINE

TECHNICAL FIELD

The present disclosure relates generally to a fan for a turbine engine.

BACKGROUND

A turbine engine generally includes a fan and a core turbine section arranged in flow communication with one another. The fan includes a plurality of fan blades.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Additional features, advantages, and embodiments of the present disclosure are set forth or apparent from a consideration of the following detailed description, drawings, and claims. Moreover, both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "low" and "high," or their respective comparative degrees (e.g., "lower" and "higher", where applicable), when used with compressor, turbine, shaft, or fan components, each refer to relative pressures and/or relative speeds within an engine unless otherwise specified. For example, a "low-speed fan" defines a component configured to operate at a rotational speed, such as a maximum allowable rotational speed, lower than a "high-speed fan" of the engine. The low-speed fan refers to a lower maximum rotational speed than a high-speed fan. The terms "low" or "high" in such aforementioned regards may additionally, or alternatively, be understood as relative to minimum allowable speeds, or minimum or maximum allowable speeds relative to normal, desired, steady state, etc., operation of the engine.

As used herein, "camber" is a measure of the curvature or of the convexity of the curve of the blades (e.g., the fan blades and/or the splitter blades) from the leading edge to the trailing edge of the blades.

As used herein, "lean angle" is the angle between a radial direction axis and a central axis of the blades (e.g., the fan blades and/or the splitter blades). For example, the lean angle is an angle when the blades deviate in a circumferential direction from the root to the tip of the blades.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one, two, four, ten, fifteen, or twenty percent margin in either individual values, range(s) of values and/or endpoints defining range(s) of values.

A turbine engine includes, in serial flow communication, a compressor, a combustor, and a turbine. The turbine is mechanically coupled to the compressor and the three components define a core turbine engine. The core turbine engine is operable to generate a flow of hot, pressurized, combustion gases to operate the turbine engine as well as to perform useful work, such as providing propulsive thrust or mechanical work. The turbine engine includes a fan coupled to the core turbine engine. The fan produces airflow into the core turbine engine and produces a bypass airflow that bypasses the core turbine engine.

During operation of the turbine engine, debris, such as birds, rocks, sand, etc., may pass through the fan. Fan blades on the fan break up (e.g., slice) the debris and centrifugally pump the debris radially away from the core turbine engine and into the bypass airflow. Some of the debris, however, may enter into the core turbine engine and may damage the components of the core turbine engine. The fan can be a low-speed fan. A low-speed fan is a fan that has a reduced rotational speed from the low-pressure turbine via a reduction gearbox. Turbine engines with low-speed fans have a greater reduction of rotational speed between the low-pressure turbine and the fan as compared to turbine engines with other types of fans. Low-speed fans, however, may not fully slice birds or other debris, include a minimal radial pump of the debris radially outward towards the bypass airflow, include high ingestion of debris into the core turbine engine (e.g., into the compressor), and may require ruggedization (e.g., strengthening) of the compressor blades in order to prevent damage of the compressor blades.

The fan can be designed to reduce the number of fan blades to reduce the weight of the fan, and, thus, reduce the inertia of the fan. Reducing the number of blades, however, increases the risk of debris entering the core turbine engine. Further, fans that are low-speed fans may not produce enough centrifugal force to direct the debris away from the core turbine engine and into the bypass airflow. Thus, the embodiments of the present disclosure provide for a fan for a turbine engine including a plurality of splitter blades positioned circumferentially between the fan blades.

The splitter blades include a span that is less than a span of the fan blades. The splitter blades are designed to increase the localized slicing of the birds or the other debris and to direct the debris into the bypass airflow. For example, the splitter blades provide for a greater blade count on the fan in front of the compressor inlet, while allowing for a low-speed fan with a reduced number of fan blades. The splitter blades provide for an increased localized solidity of the fan that helps to centrifugally pump the debris that passes through the fan at low span locations radially outward to a higher radius and into the bypass airflow. Thus, the splitter blades direct (e.g., centrifugally pump) the debris away from the core turbine engine such that the debris is directed into the bypass airflow and the debris does not enter the core turbine engine. The splitter blades provide for bird or debris slicing at low span locations (e.g., locations that the fan blades would not be able to slice the debris), and provide for improved centrifugal pumping of the debris radially outward into the bypass airflow, while having minimal effect on the bypass ratio of the turbine engine. In this way, the fan of the present disclosure directs a greater amount of debris away from the core turbine engine and into the bypass airflow as compared to fans without the benefit of the present disclosure.

The splitter blades also provide for aerodynamic improvements for the fan. For example, the splitter blades allow the fan to do more work (e.g., compress the incoming airflow) such that a pressure ratio from the fan is increased relative to fans without the benefit of the present disclosure. For example, the splitter blades help to compress the incoming airflow such that higher pressure air enters the compressor (e.g., the air is supercharged), and the overall pressure ratio of the turbine engine is increased relative to turbine engines without the benefit of the present disclosure. Thus, the compressor can include a reduced stage count as compared to compressors without the benefit of the present disclosure. Accordingly, the turbine engine is lighter, more compact, and more efficient at converting the thermal energy released by the burning fuel into useful propulsive energy or mechanical shaft work energy.

Embodiments of the present disclosure provide for coupling a part span splitter blade to the fan on a turbine engine (e.g., a high bypass ratio turbofan engine) to supercharge the air entering the compressor and to improve fan work. The embodiments provide for improved pressure ratio levels into the compressor, and, thus, reduce the compressor pressure ratio requirements. Accordingly, one or more compressor stages may be removed such that the compressor includes fewer compressor stages as compared to compressors without the benefit of the present disclosure. Embodiments of the present disclosure also reduce the fan hub radius and the camber levels of the fan blades. The splitter blades can include a different chord than the fan blades and can be coupled to the fan rotor by either incorporation into the fan platform or hooked onto the top of the disk posts between the fan blades.

Figure 1:
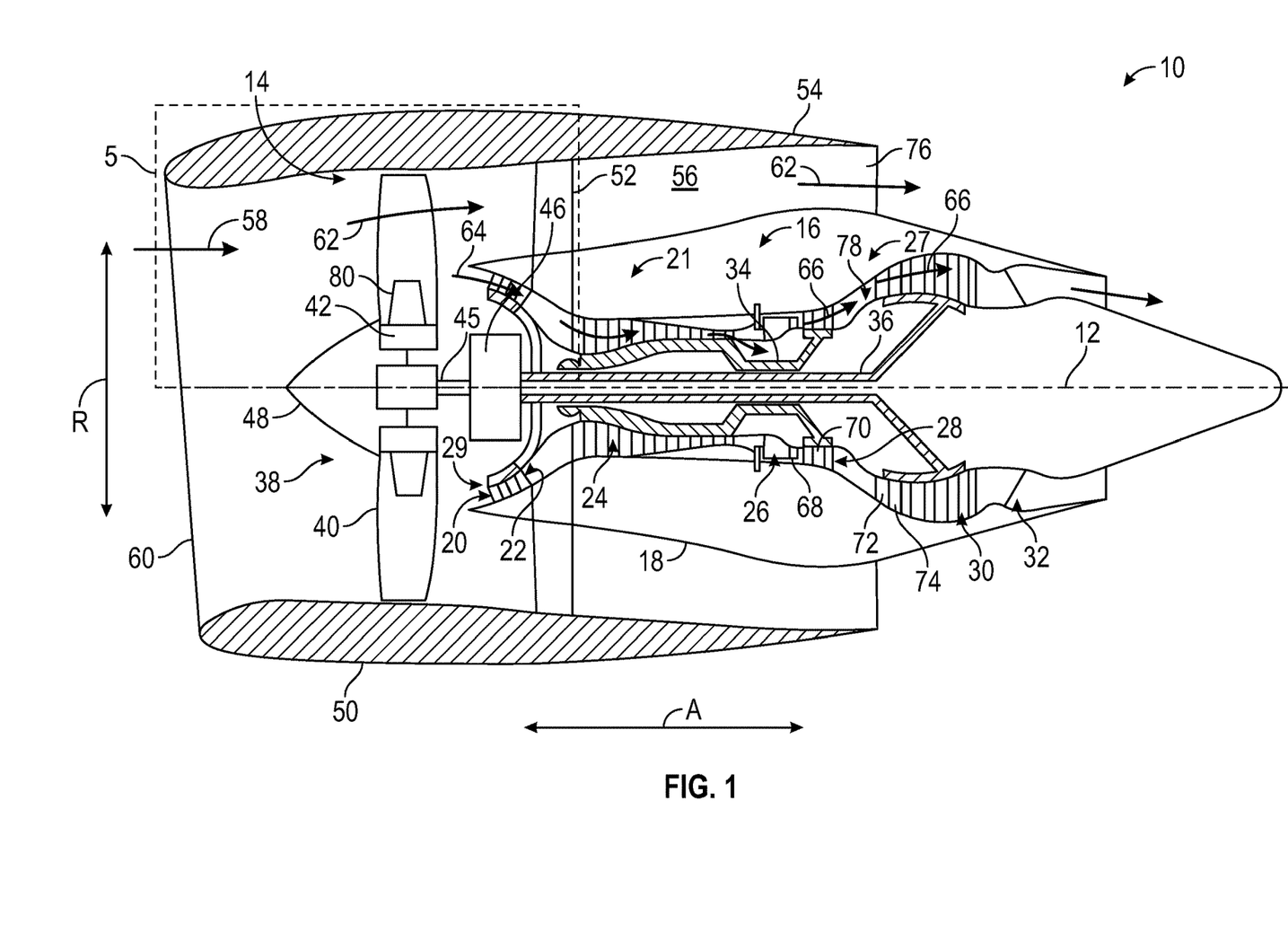
FIG. 1 is a schematic cross-sectional diagram of a turbine engine, taken along a centerline axis of the turbine engine, according to an embodiment of the present disclosure.

Referring now to the drawings, FIG. 1 is a schematic cross-sectional diagram of a turbine engine 10, taken along a centerline axis of the turbine engine 10, according to an embodiment of the present disclosure. As shown in FIG. 1, the turbine engine 10 defines an axial direction A (extending parallel to a longitudinal, centerline axis 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section 21 including a booster or a low pressure (LP) compressor 22 followed downstream by a high pressure (HP) compressor 24, a combustion section 26, a turbine section 27 including a high pressure (HP) turbine 28 followed downstream by a low pressure (LP) turbine 30, and a jet exhaust nozzle section 32. A high pressure (HP) shaft 34 or spool drivingly connects the HP turbine 28 to the HP compressor 24 to rotate the HP turbine 28 and the HP compressor 24 in unison. A low pressure (LP) shaft 36 drivingly connects the LP turbine 30 to the LP compressor 22 to rotate the LP turbine 30 and the LP compressor 22 in unison. The compressor section 21, the combustion section 26, the turbine section 27, and the jet exhaust nozzle section 32 together define a core air flowpath 29.

For the embodiment depicted in FIG. 1, the fan section 14 includes a fan 38 having a plurality of fan blades 40 coupled to a disk 42 in a spaced apart manner. As depicted in FIG. 1, the plurality of fan blades 40 extend outwardly from the disk 42 generally along the radial direction R. The fan 38 also includes a plurality of splitter blades 80 coupled to the disk 42 between the plurality of fan blades 40, as detailed further below. The plurality of fan blades 40, the plurality of splitter blades 80, and the disk 42 are together rotatable about the centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable fan hub 48 aerodynamically contoured to promote an airflow through the plurality of fan blades 40 and through the plurality of splitter blades 80. In addition, the fan section 14 includes an annular fan casing or a nacelle 50 that circumferentially surrounds the fan 38 and/or at least a portion of the core turbine engine 16. The nacelle 50 is supported relative to the core turbine engine 16 by a plurality of circumferentially spaced outlet guide vanes 52. Moreover, a downstream section 54 of the nacelle 50 extends over an outer portion of the core turbine engine 16 to define a bypass air flowpath 56 therebetween.

During operation of the turbine engine 10, a volume of air 58 enters the turbine engine 10 through an inlet 60 of the nacelle 50 and/or the fan section 14. As the volume of air 58 passes across the plurality of fan blades 40 and across the plurality of splitter blades 80, a first portion of air 62 is directed or routed into the bypass air flowpath 56, and a second portion of air 64 is directed or is routed into the upstream section of the core air flowpath 29, or, more specifically, into the annular inlet 20 of the LP compressor 22. The ratio between the first portion of air 62 and the second portion of air 64 is commonly known as a bypass ratio. The pressure of the second portion of air 64 is then increased as the second portion of air 64 routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or of kinetic energy from the combustion gases 66 is extracted via sequential stages of HP turbine stator vanes 68 that are coupled to the outer casing 18 and HP turbine rotor blades 70 that are coupled to the HP shaft 34, thus, causing the HP shaft 34 to rotate, thereby supporting operation of the HP compressor 24. The combustion gases 66 are then routed into the LP turbine 30 and expanded through the LP turbine 30. Here, a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the gearbox assembly 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass air flowpath 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable gas turbine engine, such as, for example, turbofan engines, propfan engines, turbojet engines, and/or turboshaft engines.

Figure 2:
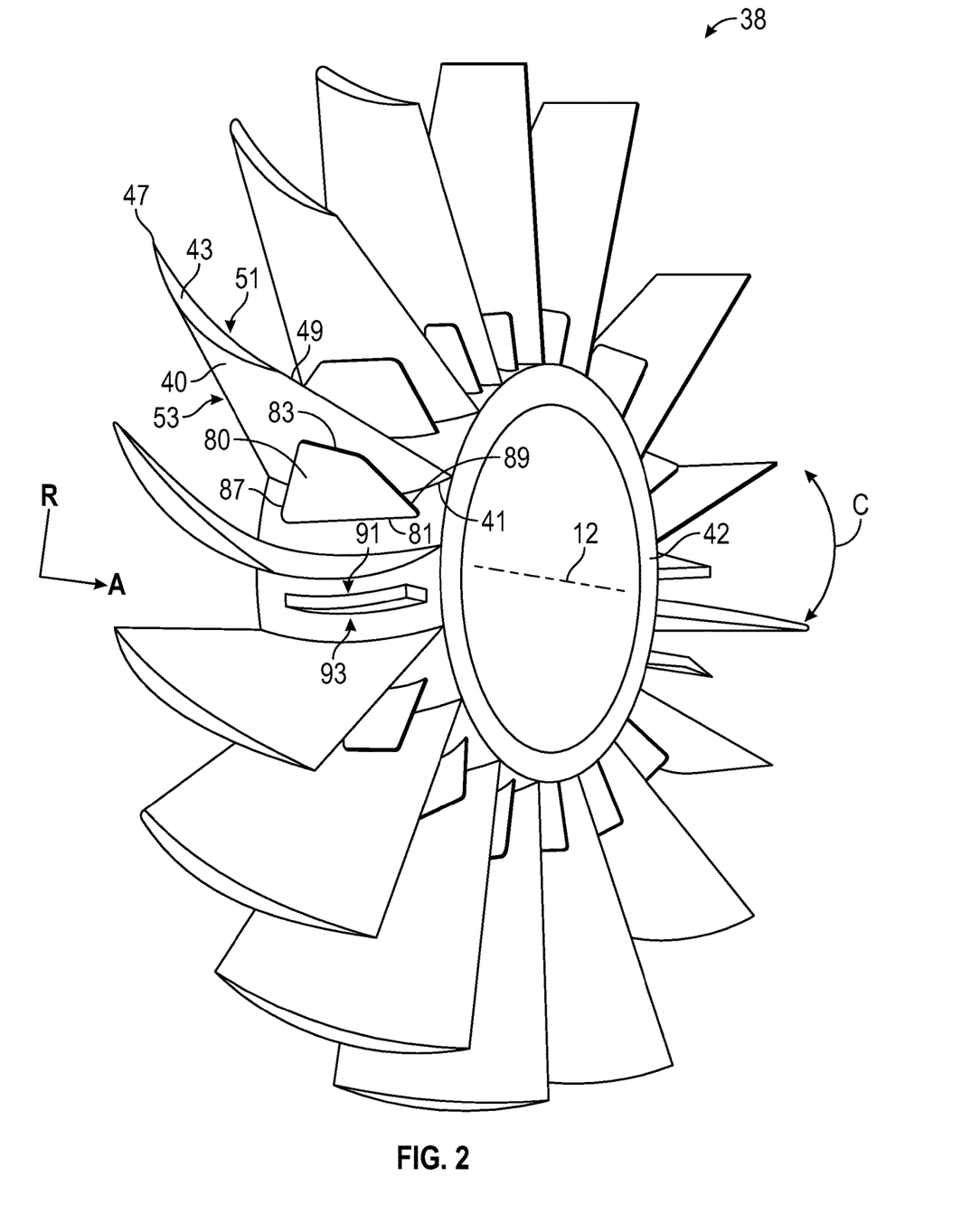
FIG. 2 is a rear side view of a fan of the turbine engine of FIG. 1, according to the present disclosure.

FIG. 2 is a rear side view of the fan 38 isolated from the turbine engine 10 (FIG. 1), according to the present disclosure. FIG. 2 shows the fan 38 defining a circumferential direction C. The plurality of fan blades 40 are uniformly circumferentially spaced about the disk 42 and are integrally formed with the disk 42. For example, the disk 42 and the plurality of fan blades 40 can be integrally cast together, can be additively manufactured with the disk 42 together, can be machined from a solid piece of material together, and/or can be made by welding individual fan blades 40 to the disk 42. In this way, the plurality of fan blades 40 are integral to a top portion of the disk 42, and the plurality of fan blades 40 and the disk 42 together form an integral, unitary, or monolithic whole. Each fan blade 40 extends from a fan blade root 41 at the disk 42 to a fan blade tip 43 and includes a fan blade leading edge 47 and a fan blade trailing edge 49. Each fan blade 40 includes a fan blade pressure side 51 joined to a fan blade suction side 53 at the fan blade leading edge 47 and at the fan blade trailing edge 49. The fan blade pressure side 51 is concave and the fan blade suction side 53 is convex. The plurality of fan blades 40 are made, for example, from metals, alloys, composites, fibers, or the like.

The fan 38 is a low-speed fan and includes fewer fan blades 40 than a high-speed fan (e.g., fans with a lower reduction in rotational speed between the low-pressure turbine and the fan). Low-speed fans include a greater reduction of speed from the LP turbine 30 (FIG. 1) as compared to high-speed fans. With fewer fan blades 40, debris (e.g., from bird strikes, rocks, etc.) may be ingested into the core turbine engine 16 (FIG. 1) through the annular inlet 20 (FIG. 1), and the debris may damage parts of the core turbine engine 16 or may affect aerodynamic performance of the core turbine engine 16. Therefore, the fan 38 is provided with the plurality of splitter blades 80 to provide additional blades to direct the debris radially outward away from the annular inlet 20 (FIG. 1) and towards the bypass air flowpath 56 (FIG. 1), as detailed further below.

A respective splitter blade 80 is disposed circumferentially between two fan blades 40. Thus, the plurality of fan blades 40 and the plurality of splitter blades 80 alternate around the periphery of the disk 42. In some embodiments, multiple splitter blades 80 can be disposed between two fan blades 40. Thus, at least one splitter blade 80 is disposed between two adjacent fan blades 40. The plurality of splitter blades 80 are integrally formed with the disk 42. For example, the disk 42 and the plurality of splitter blades 80 can be integrally cast together, can be additively manufactured with the disk 42 together, can be machined from a solid piece of material together, and/or can be made by welding individual splitter blades 80 to the disk 42. In this way, the plurality of fan blades 40 and the plurality of splitter blades 80 are integral to a top portion of the disk 42, and the plurality of fan blades 40, the plurality of splitter blades 80, and the disk 42 together form an integral, unitary, or monolithic whole. This type of structure may be referred to as a "bladed disk" or a "blisk."

Each splitter blade 80 extends from a splitter blade root 81 at the disk 42 to a splitter blade tip 83 and includes a splitter blade leading edge 87 and a splitter blade trailing edge 89. Each splitter blade 80 includes a splitter blade pressure side 91 joined to a splitter blade suction side 93 at the splitter blade leading edge 87 and at the splitter blade trailing edge 89. The splitter blade pressure side 91 is concave and the splitter blade suction side 93 is convex. The plurality of splitter blades 80 include a different size (e.g., a span or a chord) and/or a different shape than the plurality of fan blades 40, as detailed further below. In some embodiments, the shape of the plurality of splitter blades 80 is substantially the same as the shape of the plurality of fan blades 40. The plurality of splitter blades 80 are made, for example, from metals, alloys, composites, fibers, or the like. In some embodiments, the material of the plurality of splitter blades 80 is the same as the material of the plurality of fan blades 40. In some embodiments, the material of the plurality of splitter blades 80 is different than the material of the plurality of fan blades 40.

Figure 3:
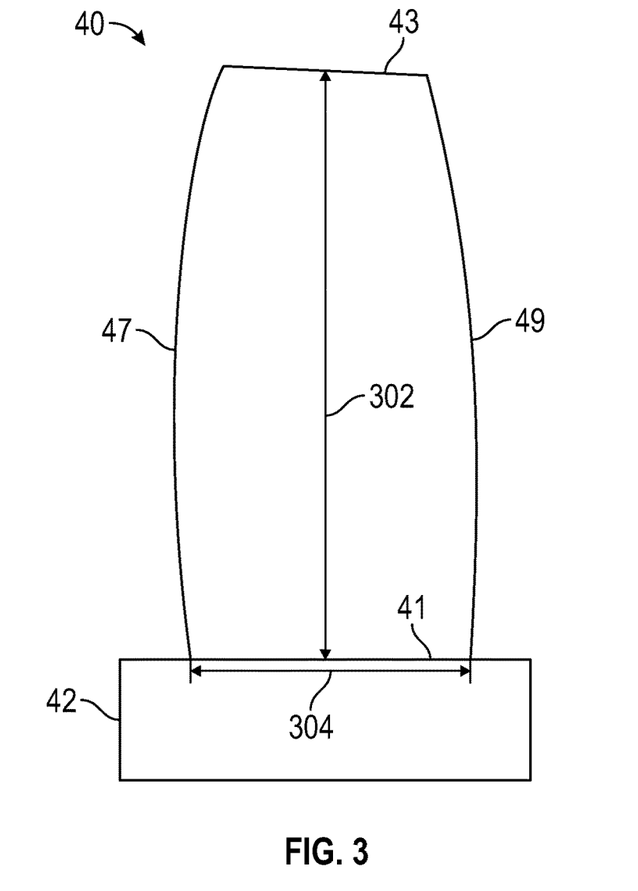
FIG. 3 is a schematic side view of a fan blade for the fan of FIG. 2, according to the present disclosure.

FIG. 3 is a schematic side view of a fan blade 40 for the fan 38, according to the present disclosure. FIG. 3 shows that each fan blade 40 has a fan blade span 302 and a fan blade chord 304. The fan blade span 302 is defined as the radial distance from the fan blade root 41 to the fan blade tip 43. The fan blade chord 304 is defined as the length of an imaginary straight line connecting the fan blade leading edge 47 and the fan blade trailing edge 49. Depending on the design of the plurality of fan blades 40, the fan blade chord 304 may be different at different locations along the fan blade span 302. In FIG. 3, the relevant measurement is the fan blade chord 304 at the fan blade root 41.

Figure 4:
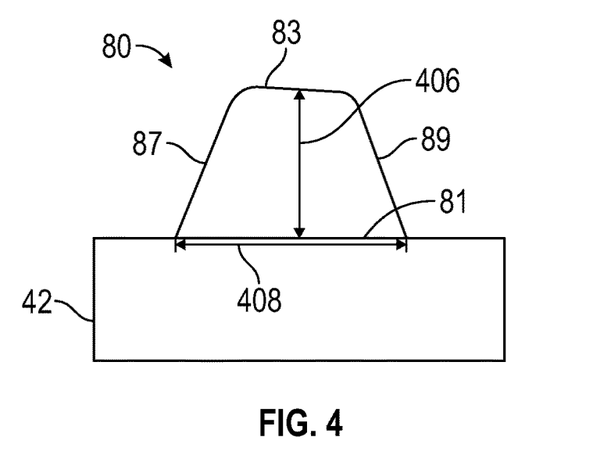
FIG. 4 is a schematic side view of a splitter blade for the fan of FIG. 2, according to the present disclosure.

FIG. 4 is a schematic side view of a splitter blade 80 for the fan 38, according to the present disclosure. FIG. 4 shows that each splitter blade 80 has a splitter blade span 406 and a splitter blade chord 408. The splitter blade span 406 is defined as the radial distance from the splitter blade root 81 to the splitter blade tip 83. The splitter blade chord 408 is defined as the length of an imaginary straight line connecting the splitter blade leading edge 87 and the splitter blade trailing edge 89. Depending on the design of the plurality of splitter blades 80, the splitter blade chord 408 may be different at different locations along the splitter blade span 406. In FIG. 4, the relevant measurement is the splitter blade chord 408 at the splitter blade root 81. The splitter blade span 406 of each splitter blade 80 is less than the fan blade span 302 (FIG. 3) of each fan blade 40 (FIG. 3). For example, the splitter blade span 406 is fifty percent (50%) or less than the fan blade span 302 (FIG. 3). The splitter blade chord 408 of each splitter blade 80 is less than the fan blade chord 304 (FIG. 3) of each fan blades 40 (FIG. 3).

Figure 5:
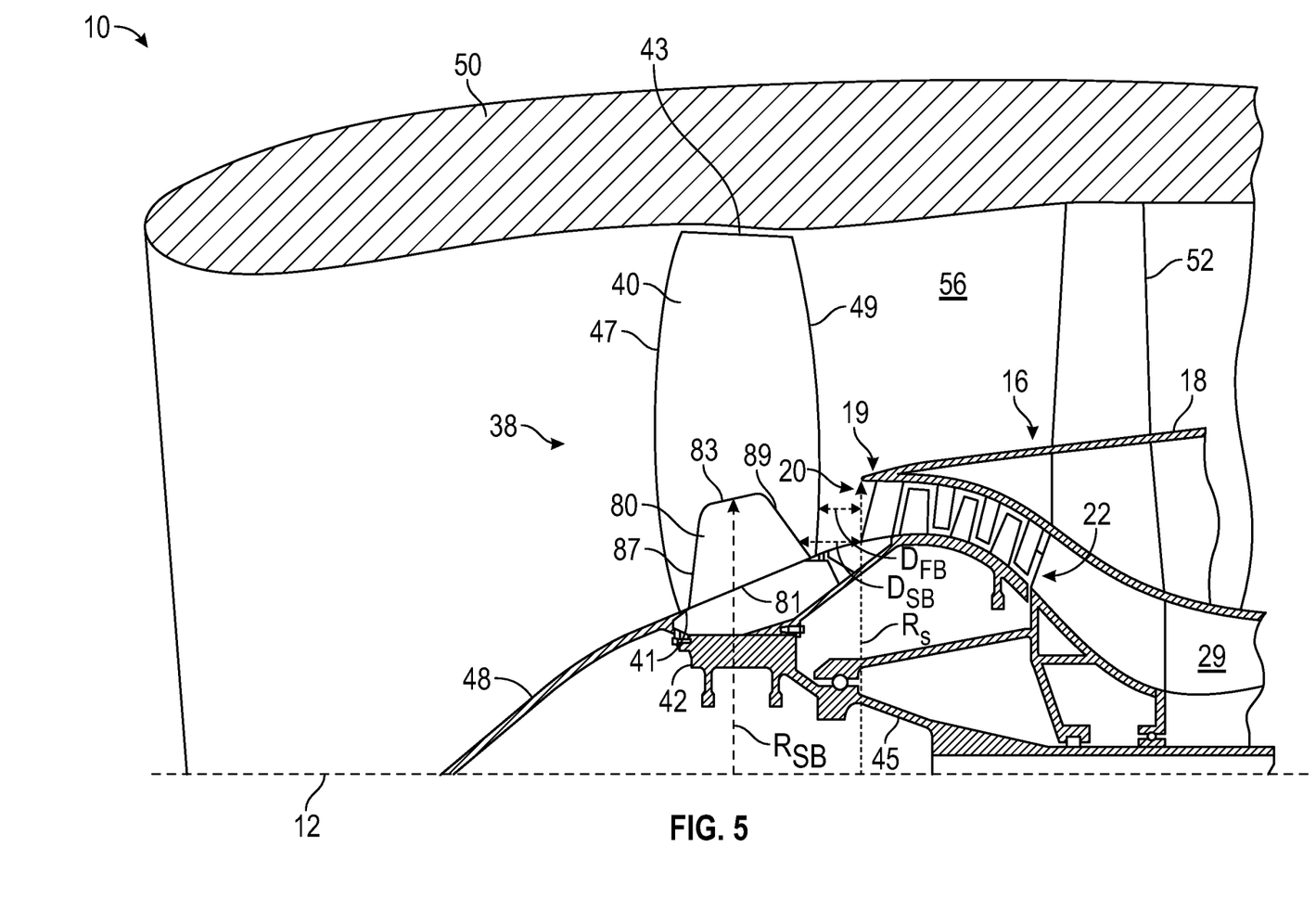
FIG. 5 is a schematic, partial cross-sectional diagram of the turbine engine of FIG. 1, taken at detail 5, according to the present disclosure.

FIG. 5 is a schematic, partial cross-sectional diagram of the turbine engine 10, taken at detail 5 in FIG. 1, according to the present disclosure. FIG. 5 shows that the outer casing 18 includes a flowpath splitter 19 separating the core air flowpath 29 of the core turbine engine 16 and the bypass air flowpath 56. The flowpath splitter 19 defines a flowpath splitter radius $R_s$ at the annular inlet 20. The flowpath splitter radius $R_s$ is defined from the centerline axis 12 to a radial outer portion of the annular inlet 20. During operation, as the fan 38 rotates, debris (e.g., birds, rocks, etc.) may be ingested into the fan 38. The centrifugal force of the plurality of fan blades 40 directs (e.g., centrifugally pumps) the debris radially outward and into the bypass air flowpath 56 such that the debris is directed out of the fan nozzle exhaust section 76 (FIG. 1). When the fan 38 is a low-speed fan, however, the centrifugal force of the plurality of fan blades 40 may not be great enough to direct a substantial amount of the debris into the bypass air flowpath 56. In this way, the core turbine engine 16 ingests the debris into the core air flowpath 29 and the rotating components of the core turbine engine 16 (e.g., the LP compressor 22, the HP compressor 24, the HP turbine 28, or the LP turbine 30) may become damaged. Accordingly, to reduce an amount of debris or to prevent the debris from being ingested into the core air flowpath 29 of the core turbine engine 16, the fan 38 includes the plurality of splitter blades 80.

The plurality of splitter blades 80 define a splitter blade radius $R_{SB}$. The splitter blade radius $R_{SB}$ is defined from the centerline axis 12 to the splitter blade tip 83 of a respective splitter blade 80. Thus, the splitter blade radius $R_{SB}$ includes a radius of the disk 42 plus the splitter blade span 406 (FIG. 4) of the splitter blade 80. The splitter blade radius $R_{SB}$ is substantially equal to the flowpath splitter radius $R_s$. For example, the plurality of splitter blades 80 include a splitter blade span 406 (FIG. 4) such that the splitter blade radius $R_{SB}$ is substantially equal to the flowpath splitter radius $R_s$. The splitter blade radius $R_{SB}$ being substantially equal to the flowpath splitter radius $R_s$ helps to direct the debris radially outward from the plurality of splitter blades 80 and into the bypass air flowpath 56, rather than into the annular inlet 20. Thus, the plurality of splitter blades 80 help to reduce an amount of debris (e.g., as compared to fans without the benefit of the present disclosure) or to prevent debris from entering the core air flowpath 29 of the core turbine engine 16. The splitter blade radius $R_{SB}$ being substantially equal to the flowpath splitter radius $R_s$ also helps to avoid tip vortices from the splitter blades 80 from entering the core air flowpath 29. In some embodiments, the splitter blade radius $R_{SB}$ is less than the flowpath splitter radius $R_s$.

When the splitter blade radius $R_{SB}$ is greater than the flowpath splitter radius $R_s$, the plurality of splitter blades 80 will continue to supercharge the LP compressor 22. When the splitter blade radius $R_{SB}$ is greater than the flowpath splitter radius $R_s$, the splitter blade span 406 (FIG. 4) and a surface area of the plurality of blades 80 are unnecessarily large, thereby increasing frictional total pressure loss into the bypass air flowpath 56 and reducing bypass stream efficiency as compared to when the splitter blade radius $R_{SB}$ is substantially equal to or less than the flowpath splitter radius $R_s$. When the splitter blade radius $R_{SB}$ is substantially less than the flowpath splitter radius $R_s$, the plurality of splitter blades 80 cannot direct a substantial amount of the debris into the bypass air flowpath 56. Accordingly, the splitter blade radius $R_{SB}$ is substantially equal to or is less than the flowpath splitter radius $R_s$ such that the splitter blades 80 shield the LP compressor 22 from the tip vortices and from the debris (e.g., the plurality of splitter blades 80 centrifugally pump the debris toward the bypass air flowpath 56), thus, protecting the LP compressor 22 from damage, while also providing the aerodynamic benefit of supercharging the LP compressor 22.

The plurality of fan blades 40 are disposed on the disk 42 at a fan blade axial distance $D_{FB}$ from the annular inlet 20. The fan blade axial distance $D_{FB}$ is defined from the fan blade trailing edge 49 of the plurality of fan blades 40 to the annular inlet 20. The plurality of splitter blades 80 are disposed on the disk 42 at a splitter blade axial distance $D_{SB}$ from the annular inlet 20. The splitter blade axial distance $D_{SB}$ is defined from the splitter blade trailing edge 89 of the splitter blades 80 to the annular inlet 20. The plurality of splitter blades 80 are axially aligned on the disk 42 such that the splitter blade axial distance $D_{SB}$ between the plurality of splitter blades 80 and the annular inlet 20 allows for the debris to be directed from the plurality of splitter blades 80 into the bypass air flowpath 56. The splitter blade axial distance $D_{SB}$ is greater than the fan blade axial distance $D_{FB}$. When the plurality of splitter blades 80 are axially aligned too close to the annular inlet 20 (e.g., the splitter blade axial distance $D_{SB}$ is relatively too short and is equal to or less than the fan blade axial distance $D_{FB}$), the debris is directed at a trajectory angle from the plurality of splitter blades 80 such that a substantial portion of the debris enters the annular inlet 20. Further, when the plurality of splitter blades 80 are axially aligned too far forward on the disk 42 (e.g., the splitter blade axial distance $D_{SB}$ is relatively large and is substantially greater than the fan blade axial distance $D_{FB}$), the aerodynamic performance of the fan 38 is reduced. Thus, the plurality of splitter blades 80 are axially aligned on the disk 42 at a splitter blade axial distance $D_{SB}$ from the annular inlet 20 such that the debris is directed into the bypass air flowpath 56 and the debris substantially avoids entering the annular inlet 20, while maintaining the aerodynamic performance of the fan 38.

The plurality of splitter blades 80 are arranged on the disk 42 such that the splitter blade trailing edge 89 is axially forward of the fan blade trailing edge 49 of the plurality of fan blades 40. The splitter blade trailing edge 89 of the plurality of splitter blades 80 being axially forward of the fan blade trailing edge 49 of the plurality of fan blades 40 further ensures that the splitter blade axial distance $D_{SB}$ allows for the plurality of splitter blades 80 to direct the debris at a trajectory angle radially outward and into the bypass air flowpath 56 while avoiding the annular inlet 20. In some embodiments, the splitter blade trailing edge 89 is aligned axially equal to the fan blade trailing edge 49. The plurality of splitter blades 80 are arranged on the disk 42 such that the splitter blade leading edge 87 is axially aft of the fan blade leading edge 47 of the plurality of fan blades 40. In this way, the entirety of the splitter blade chord 408 (FIG. 4) of the plurality of splitter blades 80 is entirely axially within the fan blade chord 304 (FIG. 3) of the plurality of fan blades 40. Positioning the splitter blade leading edge 87 axially aft of the fan blade leading edge 47 results in relatively little incidence change on the splitter blade leading edge 87 as the fan 38 is throttled towards stall. Accordingly, the plurality of splitter blades 80 will not limit and set the overall fan stall line when the splitter blade leading edge 87 is positioned axially aft of the fan blade leading edge 47. Further, positioning the splitter blade leading edge 87 axially aft of the fan blade leading edge 47 allows for a reduced splitter blade chord length, and, thus, a reduced surface area of the plurality of splitter blades 80 that results in lower friction drag and losses as compared to a longer splitter blade chord length.

Figure 6:
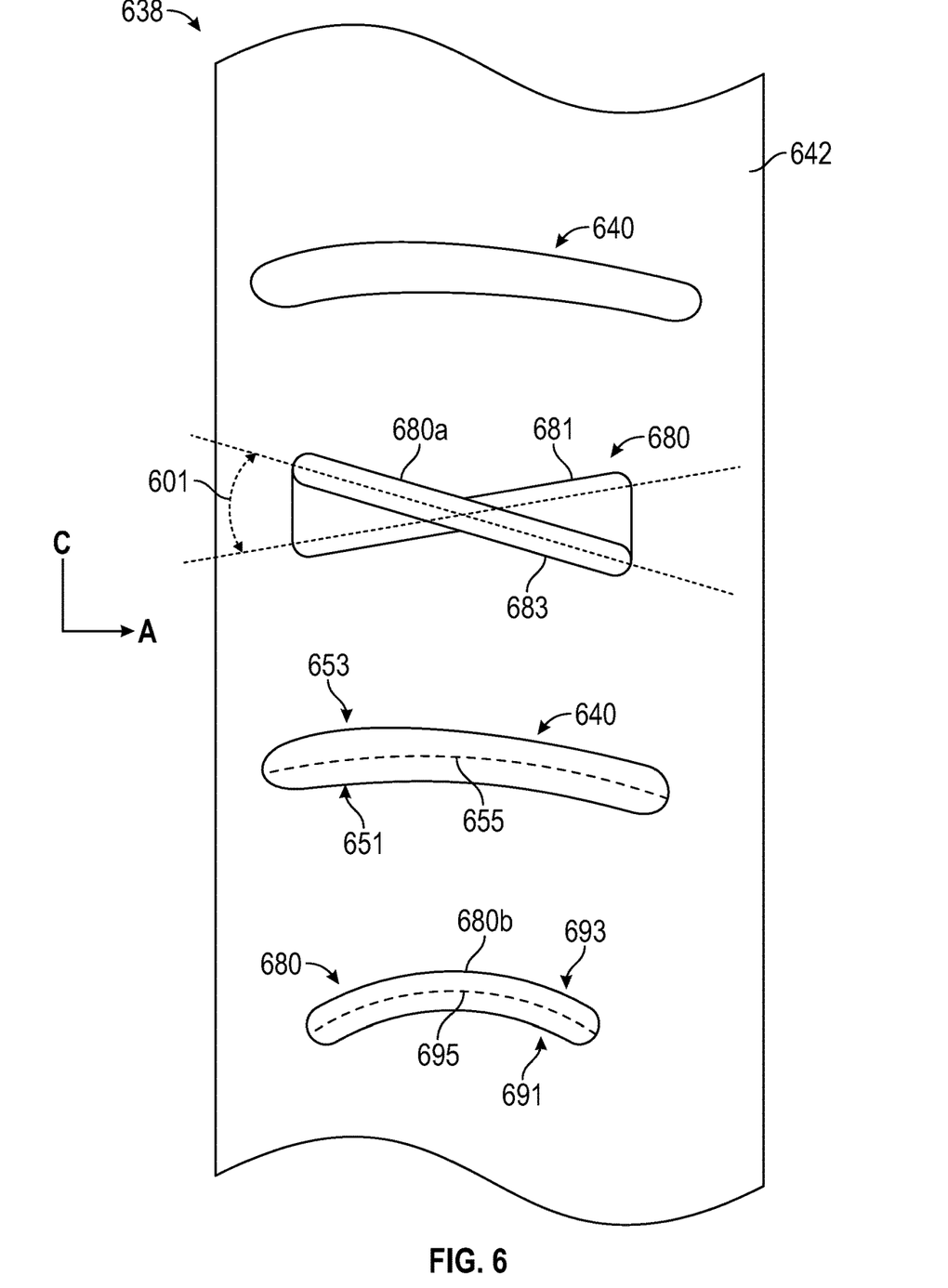
FIG. 6 is a top plan view of a portion of a fan, according to another embodiment of the present disclosure.

FIG. 6 is a top plan view of a portion of a fan 638, according to another embodiment of the present disclosure. The fan 638 includes many of the same or similar components of the fan 38 (FIGS. 1 to 5) detailed above. The fan 638 includes a plurality of fan blades 640 and a plurality of splitter blades 680 coupled to a disk 642. The plurality of fan blades 640 include a fan blade pressure side 651 and a fan blade suction side 653. The plurality of splitter blades 680 include a splitter blade pressure side 691 and a splitter blade suction side 693. The plurality of fan blades 640 define a fan blade camber 655 and the splitter blades 680 define a splitter blade camber 695. Camber is a measure of the curvature or of the convexity of the curve of the blades (e.g., the plurality of fan blades 640 and the plurality of splitter blades 680) from the leading edge to the trailing edge of the blades. The plurality of splitter blades 680 include a plurality of first splitter blades 680a and a plurality of second splitter blades 680b. The plurality of second splitter blades 680b are different than the plurality of first splitter blades 680a. For example, the plurality of second splitter blades 680b have different characteristics than the plurality of first splitter blades 680a, as detailed further below. The characteristics of the plurality of splitter blades 680 detailed below may be combined and may be utilized with the plurality of splitter blades 80 (FIGS. 1 to 5).

The plurality of first splitter blades 680a include a splitter blade twist angle 601. The splitter blade twist angle 601 is an axial angle between a splitter blade root 681 and a splitter blade tip 683 of the plurality of splitter blades 680. For example, the splitter blade root 681 extends at a first angle with respect to the axial direction A and the splitter blade tip 683 extends at a second angle with respect to the axial direction A. Thus, the splitter blade twist angle 601 is the angle between the splitter blade root 681 and the splitter blade tip 683. In some embodiments, the splitter blade twist angle 601 is different than a twist angle of the plurality of fan blades 640, as detailed further below. By varying the splitter blade twist angle 601 compared to the twist angle of the plurality of fan blades 640, the plurality of splitter blades 680 can provide improved flow fields at the lower radial positions of the splitter blades 680 as compared to the radial positions of the plurality of fan blades 640. In some embodiments, the splitter blade twist angle 601 is substantially equal to the twist angle of the plurality of fan blades 640. The splitter blade camber 695 of the second splitter blades 680b is different than the fan blade camber 655 of the plurality of fan blades 640. By varying the splitter blade camber 695 compared to the fan blade camber 655 of the plurality of fan blades 640, the plurality of splitter blades 680 can provide improved flow fields at the lower radial positions of the plurality of splitter blades 680 as compared to the radial positions of the plurality of fan blades 640. In some embodiments, the splitter blade camber 695 of the plurality of second splitter blades 680b is substantially equal to the fan blade camber 655 of the plurality of fan blades 640.

FIG. 6 shows the plurality of splitter blades 680 include two sets of splitter blades 680 (e.g., the plurality of first splitter blades 680a and the plurality of second splitter blades 680b) such that the fan 638 includes alternating splitter blades 680 having different characteristics (e.g., the plurality of first splitter blades 680a having a different splitter blade twist angle 601 than the plurality of second splitter blades 680b and the plurality of second splitter blades 680b having a different splitter blade camber 695 than the plurality of first splitter blades 680a). In some embodiments, the plurality of splitter blades 680 include more than two sets of different splitter blades 680. In some embodiments, the fan 638 includes a single set of splitter blades 680 all having the same characteristics. For example, all of the splitter blades may be the plurality of first splitter blades 680a or all of the splitter blades 680 may be the plurality of second splitter blades 680b.

Figure 7A:
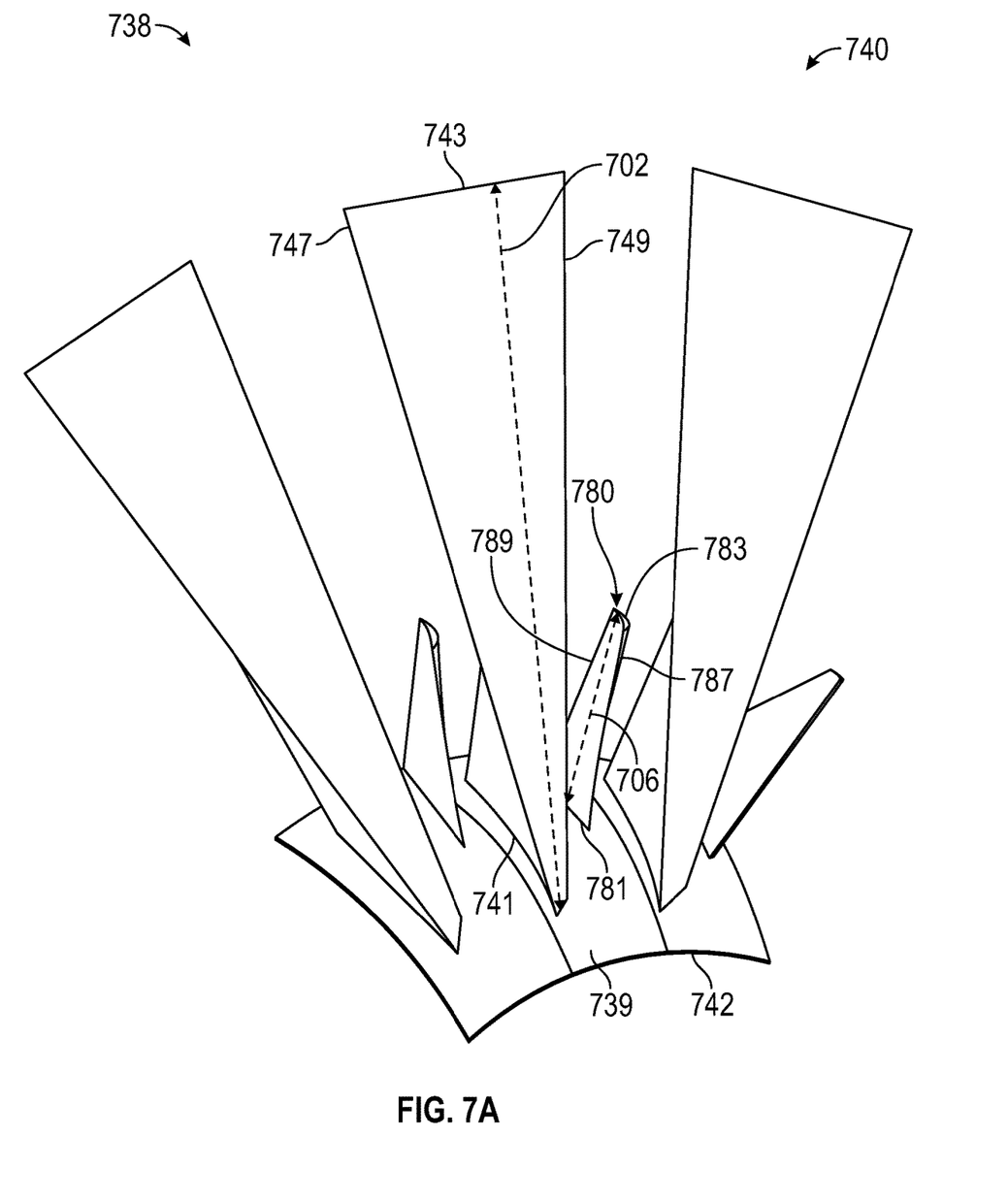
FIG. 7A is a partial front side view of a fan, according to another embodiment of the present disclosure.

FIG. 7A is a partial front side view of a fan 738, according to another embodiment of the present disclosure. The fan 738 includes a plurality of fan blades 740 and a plurality of splitter blades 780 coupled to a disk 742. Each fan blade 740 extends from a fan blade root 741 at the disk 742 to a fan blade tip 743 and includes a fan blade leading edge 747 and a fan blade trailing edge 749. Each fan blade 740 is coupled to a fan blade platform 739 that includes a dovetail (not shown) inserted into a corresponding dovetail slot of the disk 742. Each splitter blade 780 extends from a splitter blade root 781 at the disk 742 to a splitter blade tip 783 and includes a splitter blade leading edge 787 and a splitter blade trailing edge 789. A respective splitter blade 780 is coupled to the fan blade platform 739. In this way, the respective splitter blade 780 is incorporated into the fan blade platform 739. Thus, each fan blade platform 739 includes a fan blade 740 and a splitter blade 780. In some embodiments, the plurality of splitter blades 780 are coupled to the disk 742 directly such that the plurality of splitter blades 780 are integral with the disk 742, as detailed above with respect to FIG. 2. In some embodiments, the plurality of splitter blades 780 include a splitter blade platform (not shown) separate from the fan blade platform 739 and that includes a dovetail inserted into a corresponding dovetail slot of the disk 742.

Each fan blade 740 has a fan blade span 702 that is defined as the radial distance from the fan blade root 741 to the fan blade tip 743. Each splitter blade 780 has a splitter blade span 706 that is defined as the radial distance from the splitter blade root 781 to the splitter blade tip 783. FIG. 7A shows that the splitter blade span 706 of the plurality of splitter blades 780 is less than the fan blade span 702 of the plurality of fan blades 740. For example, the splitter blade span 706 of the plurality of splitter blades 780 is fifty percent (50%) or less than the fan blade span 702 of the plurality of fan blades 740. The splitter blade span 706 of the plurality of splitter blades 780 is chosen such that the splitter blade radius $R_{SB}$ (FIG. 5) is substantially equal to the flowpath splitter radius $R_s$ (FIG. 5), as detailed above. The characteristics of the plurality of splitter blades 780 may be combined and may be utilized with the plurality of splitter blades 80 (FIGS. 1 to 5).

Figure 7B:
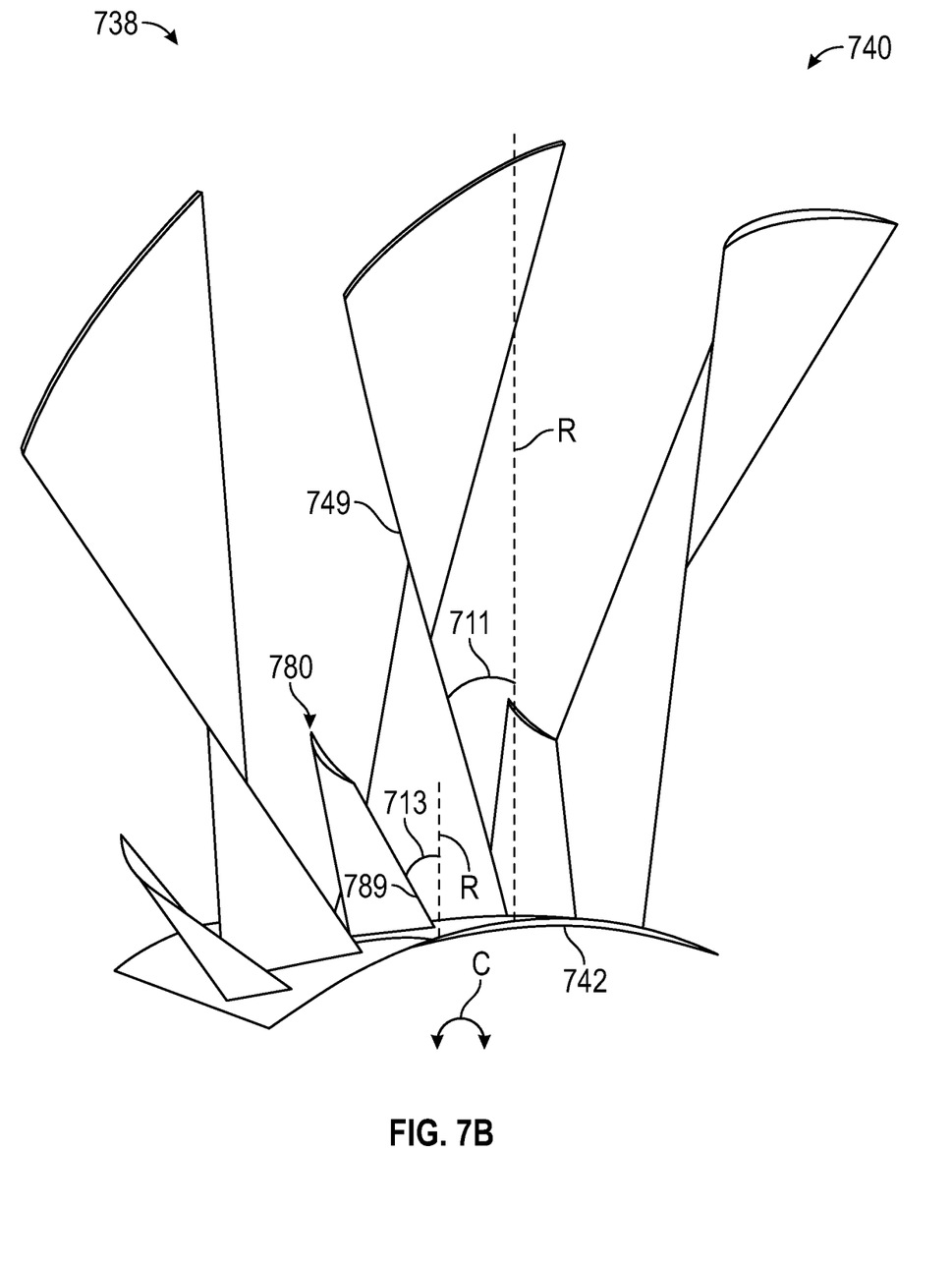
FIG. 7B is a partial rear side view of the fan of FIG. 7A, according to the present disclosure.

FIG. 7B is a partial rear side view of the fan 738, according to the present disclosure. For example, FIG. 7B shows the fan blade trailing edge 749 of the plurality of fan blades 740 and shows the splitter blade trailing edge 789 of the plurality of splitter blades 780. Each fan blade 740 is disposed on the disk 742 at a fan blade lean angle 711 and each splitter blade 780 is disposed on the disk 742 at a splitter blade lean angle 713. Lean angle is the angle between the radial direction R axis and a central axis of the blades (e.g., the plurality of fan blades 740 and the plurality of splitter blades 780). For example, the lean angle occurs when the blades deviate in the circumferential direction C from the root to the tip of the blades. The splitter blade lean angle 713 of the plurality of splitter blades 780 is different than the fan blade lean angle 711 of the plurality of fan blades 740. By varying the splitter blade lean angle 713 as compared to the fan blade lean angle 711, the plurality of splitter blades 780 can provide improved flow fields at the lower radial positions of the plurality of splitter blades 780 as compared to the radial positions of the plurality of fan blades 740. Further, the different splitter blade lean angle 713 of the plurality of splitter blades 780 provides for improved airfoil attachment stresses by balancing centrifugally induced bending of the plurality of splitter blades 780. In some embodiments, the splitter blade lean angle 713 of the plurality of splitter blades 780 is substantially equal to the fan blade lean angle 711 of the plurality of fan blades 740.

Figure 7C:
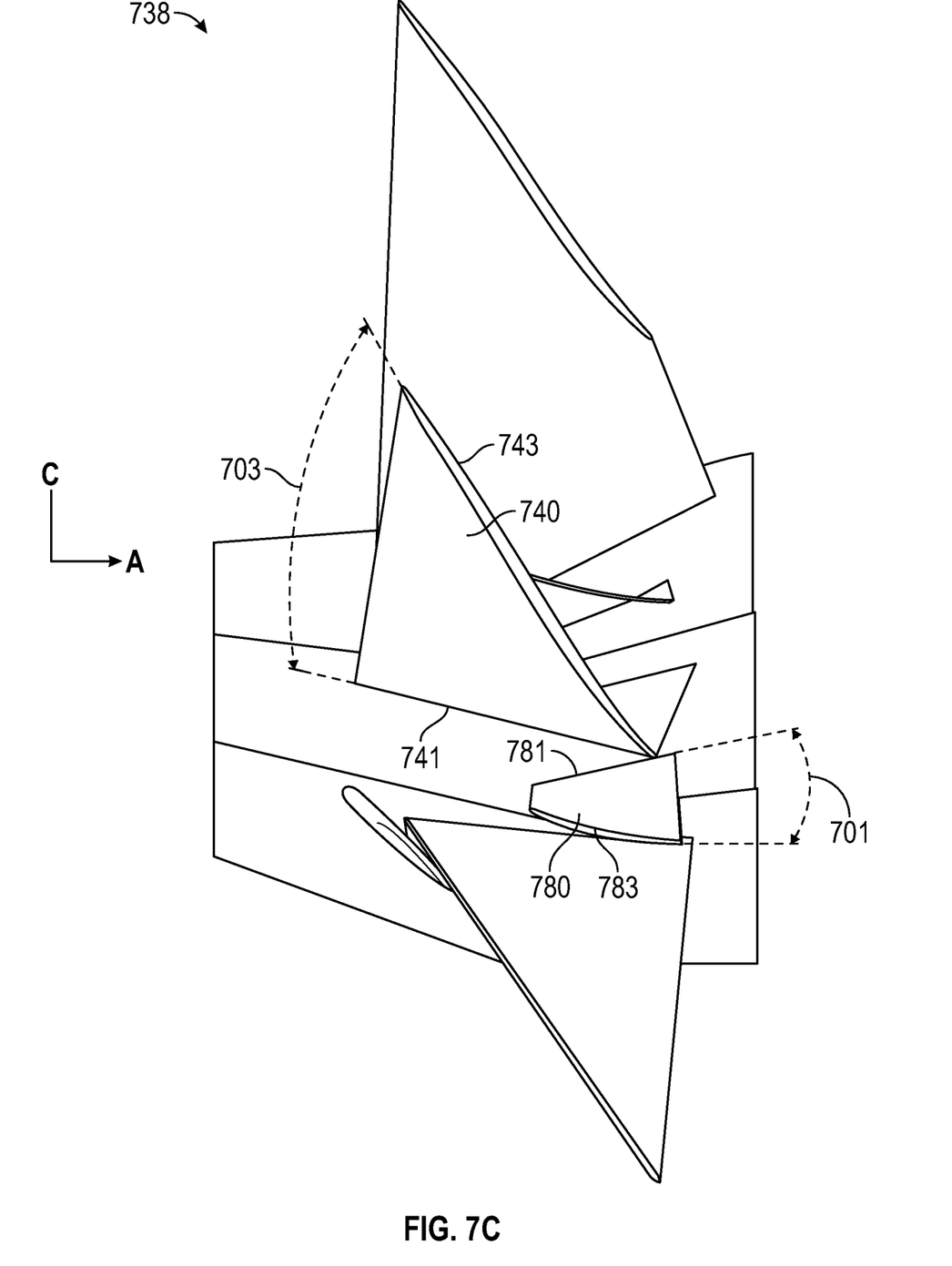
FIG. 7C is a partial top side view of the fan of FIG. 7A, according to the present disclosure.

FIG. 7C is a partial top side view of the fan 738, according to the present disclosure. Each fan blade 740 includes a fan blade twist angle 703. The fan blade twist angle 703 is an axial angle between the fan blade root 741 and the fan blade tip 743 of the plurality of fan blades 740. For example, the fan blade root 741 extends at a first angle with respect to the axial direction A and the fan blade tip 743 extends at a second angle with respect to the axial direction A. Thus, the fan blade twist angle 703 is the angle between the fan blade root 741 and the fan blade tip 743. Each splitter blade 780 includes a splitter blade twist angle 701. The splitter blade twist angle 701 is an axial angle between the splitter blade root 781 and the splitter blade tip 783 of the plurality of splitter blades 780. For example, the splitter blade root 781 extends at a first angle with respect to the axial direction A and the splitter blade tip 783 extends at a second angle with respect to the axial direction A. Thus, the splitter blade twist angle 701 is the angle between the splitter blade root 781 and the splitter blade tip 783. FIG. 7C shows that the splitter blade twist angle 701 of the plurality of splitter blades 780 is different than the fan blade twist angle 703 of the plurality of fan blades 740 to provide improved flow fields at the lower radial positions of the plurality of splitter blades 780 as compared to the radial positions of the plurality of fan blades 740, as detailed above with respect to FIG. 6.

As detailed above, the embodiments of the present disclosure provide for splitter blades that help to centrifugally pump debris radially outward into the bypass air flowpath. Thus, the plurality of splitter blades of the present disclosure ensure that debris that passes through the fan at low span locations (e.g., radially inner locations) is broken apart and directed into the bypass air flowpath and away from the core turbine engine. Accordingly, the plurality of splitter blades help to reduce or to prevent damage in the core turbine engine, while also providing aerodynamic benefits of increased pressure ratios for the compressor. Further, by varying the camber, the twist angle, or the lean angle of the plurality of splitter blades compared to the plurality of fan blades, the plurality of splitter blades provide improved air flow at lower span locations compared to the plurality of fan blades, while also providing the benefits of slicing debris and reducing the amount of debris that enters the core turbine engine.

Further aspects are provided by the subject matter of the following clauses.

A fan for a turbine engine having a core air flowpath and a bypass air flowpath comprising a disk that rotates about a centerline axis, a plurality of fan blades coupled to the disk, and a plurality of splitter blades coupled to the disk and positioned between the plurality of fan blades, the plurality of splitter blades being axially aligned on the disk at a splitter blade axial distance from an annular inlet of the core air flowpath such that the plurality of splitter blades direct debris that passes through the fan into the bypass air flowpath.

The fan of the preceding clause, the annular inlet including a flowpath splitter radius defined from the centerline axis to a flowpath splitter of the turbine engine at the annular inlet, and the plurality of splitter blades each includes a splitter blade radius defined from the centerline axis to a tip of the plurality of splitter blades, the splitter blade radius being substantially equal to or less than the flowpath splitter radius.

The fan of any preceding clause, the plurality of fan blades each including a fan blade span and the plurality of splitter blades each includes a splitter blade span, the splitter blade span being less than the fan blade span.

The fan of any preceding clause, the plurality of splitter blades including a plurality of first splitter blades and a plurality of second splitter blades, the plurality of second splitter blades having different characteristics than the plurality of first splitter blades.

The fan of any preceding clause, the plurality of fan blades each including a fan blade camber and the plurality of splitter blades each includes a splitter blade camber, the splitter blade camber being different than the fan blade camber.

The fan of any preceding clause, the plurality of fan blades each including a fan blade twist angle and the plurality of splitter blades each including a splitter blade twist angle, the splitter blade twist angle being different than the fan blade twist angle.

The fan of any preceding clause, the plurality of fan blades each including fan blade lean angle and the plurality of splitter blades each including a splitter blade lean angle, the splitter blade lean angle being different than the fan blade lean angle.

The fan of any preceding clause, the plurality of fan blades each including a fan blade trailing edge and the plurality of splitter blades each including a splitter blade trailing edge, the splitter blade trailing edge being aligned on the disk axially forward of the fan blade trailing edge.

The fan of any preceding clause, the plurality of fan blades each including a fan blade leading edge and the plurality of splitter blades each including a splitter blade leading edge, the splitter blade leading edge being aligned on the disk axially aft of the fan blade leading edge.

The fan of any preceding clause, the plurality of fan blades each including a fan blade chord and the plurality of splitter blades each including a splitter blade chord, the plurality of splitter blades being aligned on the disk such that the splitter blade chord is entirely axially within the fan blade chord.

The fan of any preceding clause, the plurality of fan blades being positioned on the disk at a fan blade axial distance from the annular inlet of the core air flowpath, the splitter blade axial distance being greater than the fan blade axial distance.

The fan of any preceding clause, the fan blade axial distance being defined from the fan blade trailing edge to the annular inlet.

The fan of any preceding clause, the splitter blade axial distance being defined from the splitter blade trailing edge to the annular inlet.

The fan of any preceding clause, the plurality of fan blades each including a fan blade camber and the plurality of splitter blades each includes a splitter blade camber, the splitter blade camber being substantially equal to the fan blade camber.

The fan of any preceding clause, the plurality of fan blades each including a fan blade twist angle and the plurality of splitter blades each including a splitter blade twist angle, the splitter blade twist angle being substantially equal to the fan blade twist angle.

The fan of any preceding clause, the plurality of fan blades each including fan blade lean angle and the plurality of splitter blades each including a splitter blade lean angle, the splitter blade lean angle being substantially equal to the fan blade lean angle.

The fan of any preceding clause, a shape of the plurality of splitter blades being different than a shape of the plurality of fan blades.

The fan of any preceding clause, a shape of the plurality of splitter blades being substantially the same as a shape of the plurality of fan blades.

The fan of any preceding clause, a material of the plurality of splitter blades being different than a material of the plurality of fan blades.

The fan of any preceding clause, a material of the plurality of splitter blades being the same as a material of the plurality of fan blades.

The fan of any preceding clause, a material of the plurality of splitter blades being at least one of metals, alloys, composites, or fibers.

The fan of any preceding clause, a material of the plurality of fan blades being at least one of metals, alloys, composites, or fibers.

The fan of any preceding clause, the plurality of splitter blades being integrally formed with the disk.

The fan of any preceding clause, each of the plurality of fan blades extending from a fan blade platform, and each of the plurality of splitter blades being coupled to the fan blade platform of a respective fan blade.

A turbine engine comprises a core air flowpath having an annular inlet, a bypass air flowpath, and a fan positioned axially forward of the core air flowpath and the bypass air flowpath. The fan comprises a disk that rotates about a centerline axis, a plurality of fan blades coupled to the disk, and a plurality of splitter blades coupled to the disk and positioned between the plurality of fan blades, the plurality of splitter blades being axially aligned on the disk at a splitter blade axial distance from the annular inlet of the core air flowpath such that the plurality of splitter blades direct debris that passes through the fan into the bypass air flowpath.

The turbine engine of the preceding clause, further including a flowpath splitter that separates the core air flowpath at the annular inlet and the bypass air flowpath, the annular inlet including a flowpath splitter radius defined from the centerline axis to the flowpath splitter, and the plurality of splitter blades each includes a splitter blade radius defined from the centerline axis to a tip of the plurality of splitter blades, the splitter blade radius being substantially equal to or less than the flowpath splitter radius.

The turbine engine of any preceding clause, the plurality of fan blades each including a fan blade span and the plurality of splitter blades each including a splitter blade span, the splitter blade span being less than the fan blade span.

The turbine engine of any preceding clause, the plurality of splitter blades including a plurality of first splitter blades and a plurality of second splitter blades, the plurality of second splitter blades having different characteristics than the plurality of first splitter blades.

The turbine engine of any preceding clause, the plurality of fan blades each including a fan blade camber and the plurality of splitter blades each including a splitter blade camber, the splitter blade camber being different than the fan blade camber.

The turbine engine of any preceding clause, the plurality of fan blades each including a fan blade twist angle and the plurality of splitter blades each including a splitter blade twist angle, the splitter blade twist angle being different than the fan blade twist angle.

The turbine engine of any preceding clause, the plurality of fan blades each including fan blade lean angle and the plurality of splitter blades each including a splitter blade lean angle, the splitter blade lean angle being different than the fan blade lean angle.

The turbine engine of any preceding clause, the plurality of fan blades each including a fan blade trailing edge and the plurality of splitter blades each including a splitter blade trailing edge, the splitter blade trailing edge being aligned on the disk axially forward of the fan blade trailing edge.

The turbine engine of any preceding clause, the plurality of fan blades each including a fan blade leading edge and the plurality of splitter blades each including a splitter blade leading edge, the splitter blade leading edge being aligned on the disk axially aft of the fan blade leading edge.

The turbine engine of any preceding clause, the plurality of fan blades each including a fan blade chord and the plurality of splitter blades each including a splitter blade chord, the plurality of splitter blades being aligned on the disk such that the splitter blade chord is entirely axially within the fan blade chord.

The turbine engine of any preceding clause, the plurality of fan blades being positioned on the disk at a fan blade axial distance from the annular inlet of the core air flowpath, the splitter blade axial distance being greater than the fan blade axial distance.

The turbine engine of any preceding clause, the fan blade axial distance being defined from the fan blade trailing edge to the annular inlet.

The turbine engine of any preceding clause, the splitter blade axial distance being defined from the splitter blade trailing edge to the annular inlet.

The turbine engine of any preceding clause, the plurality of fan blades each including a fan blade camber and the plurality of splitter blades each includes a splitter blade camber, the splitter blade camber being substantially equal to the fan blade camber.

The turbine engine of any preceding clause, the plurality of fan blades each including a fan blade twist angle and the plurality of splitter blades each including a splitter blade twist angle, the splitter blade twist angle being substantially equal to the fan blade twist angle.

The turbine engine of any preceding clause, the plurality of fan blades each including fan blade lean angle and the plurality of splitter blades each including a splitter blade lean angle, the splitter blade lean angle being substantially equal to the fan blade lean angle.

The turbine engine of any preceding clause, a shape of the plurality of splitter blades being different than a shape of the plurality of fan blades.

The turbine engine of any preceding clause, a shape of the plurality of splitter blades being substantially the same as a shape of the plurality of fan blades.

The turbine engine of any preceding clause, a material of the plurality of splitter blades being different than a material of the plurality of fan blades.

The turbine engine of any preceding clause, a material of the plurality of splitter blades being the same as a material of the plurality of fan blades.

The turbine engine of any preceding clause, a material of the plurality of splitter blades being at least one of metals, alloys, composites, or fibers.

The turbine engine of any preceding clause, a material of the plurality of fan blades being at least one of metals, alloys, composites, or fibers.

The turbine engine of any preceding clause, the plurality of splitter blades being integrally formed with the disk.

The turbine engine of any preceding clause, each of the plurality of fan blades extending from a fan blade platform, and each of the plurality of splitter blades being coupled to the fan blade platform of a respective fan blade.

Although the foregoing description is directed to the preferred embodiments of the present disclosure, other variations and modifications will be apparent to those skilled in the art and may be made without departing from the spirit or the scope of the disclosure. Moreover, features described in connection with one embodiment of the present disclosure may be used in conjunction with other embodiments, even if not explicitly stated above.

The invention claimed is:

1. A fan for a turbine engine having a core air flowpath and a bypass air flowpath, the fan comprising:
    a disk that rotates about a centerline axis;
    a plurality of fan blades coupled to the disk; and
    a plurality of splitter blades coupled to the disk and positioned between the plurality of fan blades, the plurality of splitter blades being axially aligned on the disk at a splitter blade axial distance from an annular inlet of the core air flowpath such that the plurality of splitter blades direct debris that passes through the fan into the bypass air flowpath,
    wherein the annular inlet includes a flowpath splitter radius defined from the centerline axis to a flowpath splitter of the turbine engine at the annular inlet, and the plurality of splitter blades each includes a splitter blade radius defined from the centerline axis to a tip of the plurality of splitter blades, the splitter blade radius being equal to or less than the flowpath splitter radius,
    wherein each of the plurality of fan blades includes a fan blade chord and each of the plurality of splitter blades includes a splitter blade chord, and the splitter blade chord is less than or equal to the fan blade chord,
    wherein each of the plurality of splitter blades includes a splitter blade leading edge located within the fan blade chord of the plurality of fan blades, and
    wherein the plurality of splitter blades includes a plurality of first splitter blades and a plurality of second splitter blades, the plurality of second splitter blades having different characteristics than the plurality of first splitter blades.

2. The fan of claim 1, wherein the plurality of fan blades each includes a fan blade span and the plurality of splitter blades each includes a splitter blade span, the splitter blade span being less than the fan blade span.

3. The fan of claim 1, wherein the plurality of fan blades each includes a fan blade camber and the plurality of splitter blades each includes a splitter blade camber, the splitter blade camber being different than the fan blade camber.

4. The fan of claim 1, wherein the plurality of fan blades each includes a fan blade twist angle and the plurality of splitter blades each includes a splitter blade twist angle, the splitter blade twist angle being different than the fan blade twist angle.

5. The fan of claim 1, wherein the plurality of fan blades each includes a fan blade lean angle and the plurality of splitter blades each includes a splitter blade lean angle, the splitter blade lean angle being different than the fan blade lean angle.

6. The fan of claim 1, wherein the plurality of fan blades each includes a fan blade trailing edge and the plurality of splitter blades each includes a splitter blade trailing edge, the splitter blade trailing edge being aligned on the disk axially forward of the fan blade trailing edge.

7. The fan of claim 6, wherein the plurality of fan blades each includes a fan blade leading edge, the splitter blade leading edge being aligned on the disk axially aft of the fan blade leading edge.

8. The fan of claim 6, wherein the plurality of splitter blades being aligned on the disk such that the splitter blade chord is entirely axially within the fan blade chord.

9. A turbine engine comprising:
    a core air flowpath having an annular inlet;
    a bypass air flowpath; and
    a fan positioned axially forward of the core air flowpath and the bypass air flowpath, the fan comprising:
        a disk that rotates about a centerline axis;
        a plurality of fan blades coupled to the disk; and
        a plurality of splitter blades coupled to the disk and positioned between the plurality of fan blades, the plurality of splitter blades being axially aligned on the disk at a splitter blade axial distance from the annular inlet of the core air flowpath such that the plurality of splitter blades direct debris that passes through the fan into the bypass air flowpath; and
    a flowpath splitter that separates the core air flowpath at the annular inlet and the bypass air flowpath, the annular inlet including a flowpath splitter radius defined from the centerline axis to the flowpath splitter, and the plurality of splitter blades each includes a splitter blade radius defined from the centerline axis to a tip of the plurality of splitter blades, the splitter blade radius being equal to or less than the flowpath splitter radius, wherein each of the plurality of fan blades includes a fan blade chord and each of the plurality of splitter blades includes a splitter blade chord, and the splitter blade chord is less than or equal to the fan blade chord, wherein each of the plurality of splitter blades includes a splitter blade leading edge located within the fan blade chord of the plurality of fan blades, and wherein the plurality of splitter blades includes a plurality of first splitter blades and a plurality of second splitter blades, the plurality of second splitter blades having different characteristics than the plurality of first splitter blades.

10. The turbine engine of claim 9, wherein the plurality of fan blades each includes a fan blade span and the plurality of splitter blades each includes a splitter blade span, the splitter blade span being less than the fan blade span.

11. The turbine engine of claim 9, wherein the plurality of fan blades each includes a fan blade camber and the plurality of splitter blades each includes a splitter blade camber, the splitter blade camber being different than the fan blade camber.

12. The turbine engine of claim 9, wherein the plurality of fan blades each includes a fan blade twist angle and the plurality of splitter blades each includes a splitter blade twist angle, the splitter blade twist angle being different than the fan blade twist angle.

13. The turbine engine of claim 9, wherein the plurality of fan blades each includes a fan blade lean angle and the plurality of splitter blades each includes a splitter blade lean angle, the splitter blade lean angle being different than the fan blade lean angle.

14. The turbine engine of claim 9, wherein the plurality of fan blades each includes a fan blade trailing edge and the plurality of splitter blades each includes a splitter blade trailing edge, the splitter blade trailing edge being aligned on the disk axially forward of the fan blade trailing edge.

15. The turbine engine of claim 14, wherein the plurality of fan blades each includes a fan blade leading edge, the splitter blade leading edge being aligned on the disk axially aft of the fan blade leading edge.

16. The turbine engine of claim 14, wherein the plurality of splitter blades being aligned on the disk such that the splitter blade chord is entirely axially within the fan blade chord.

* * * * *